Feb. 13, 1934. G. H. BLOMQUIST ET AL 1,946,667
PRODUCTION OF FURFURAL
Filed Aug. 21, 1930
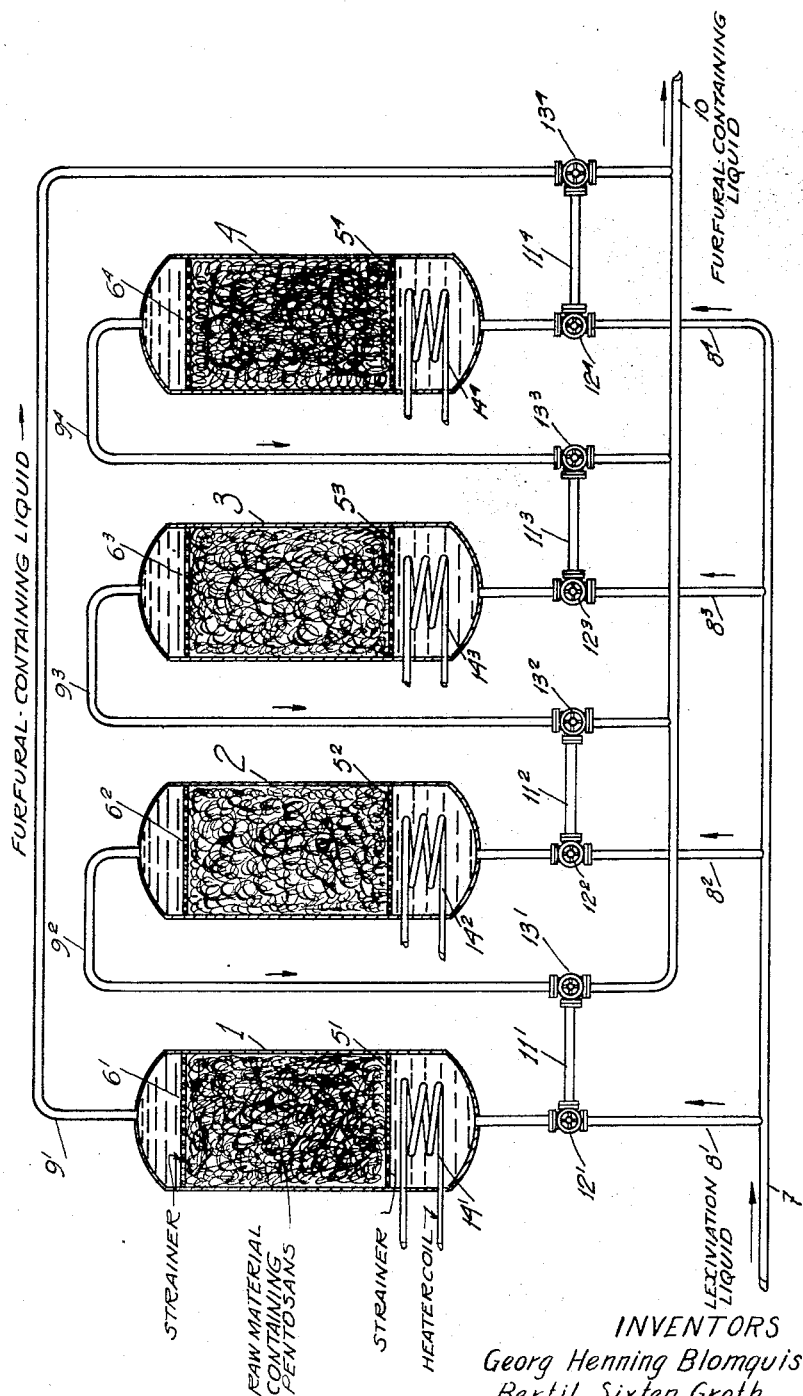
INVENTORS
Georg Henning Blomquist
Bertil Sixten Groth
by
Attorney Patented Feb. 13, 1934

1,946,667

UNITED STATES PATENT OFFICE 1,946,667

PRODUCTION OF FURFURAL

Georg Henning Blomqvist and Bertil Sixten Groth, Stockholm, Sweden, assignors to Kemiska Kontrollbyrån Aktiebolag, Stockholm, Sweden, and Aktiebolaget A. Heyman, Vargarda, Sweden, joint-stock companies of Sweden Application August 21, 1930, Serial No. 476,890, and in Sweden December 17, 1929

1 Claim. (Cl. 260—54)

The present invention is for improvements in and relating to the production of furfural.

Furfural is produced commercially by distilling furfural-producing substances, such as husks of oat and rice or other materials containing pentosans, with water or a solution in water of an acid or acid salts. A mixture of furfural and water vapour is distilled off, which is introduced into a rectification column for separation of the furfural. Or the raw material may be immersed in an acidified liquid, whereafter the solution thus obtained is heated under increased or normal pressure for the formation of furfural, which is then distilled off. It has generally been assumed that the distilling off of the furfural from the reaction mixture in the one case or the other had to take place immediately after the formation of the same and that it otherwise was rapidly destroyed. However, this immediate distilling off of the furfural is a disadvantage in that the vapours obtained at the beginning of the process are rich in furfural but at the end of the process contain but small quantities of furfural whereas the distilling apparatus (the column) for its satisfactory functioning should be supplied the whole time with a mixture of water and furfural vapour of as nearly constant composition as possible. It has been proposed to avoid this difficulty by cooling and condensing the furfural-water vapours, collecting and mixing the condensate and again distilling and fractionating in a column. This satisfies the condition that the column should be supplied with furfural-water vapours of constant composition, but at the same time the process has been complicated with yet another distillation, which is unsatisfactory from the point of view of heat economy.

The present invention has for its object to eliminate these disadvantages and is based on the observation, that, contrary to the hitherto general assumption, it is under certain conditions not necessary to distill off the furfural at once but that it is possible to obtain by lixiviation of the pentosan-containing raw material at a suitable temperature and pressure direct and without distillation a furfural-containing solution, from which the furfural may be separated in a subsequent step. The furfural-containing solution obtained by lixiviation, is employed for feeding the distilling apparatus and in this way the above-mentioned condition to supply the column with a mixture of furfural and water vapor of substantially constant composition is satisfied; at the same time a double distillation is avoided.

According to the invention the lixiviation of the pentosan-containing raw material, i. e. the production of the furfural-containing solution, is preferably carried out by means of a battery of two or several interconnected boilers or autoclaves, in which the raw material is lixiviated in the manner described below. In this way a solution having a fairly constant content of furfural is obtained substantially continuously. By collecting (and mixing) the furfural-containing solution in a seperate container before the distilling there is further assurance that the distilling takes place under substantially constant conditions.

The invention will be described in the following in detail by way of an example and with reference to the accompanying drawing, but it is evident that modifications are possible within the limits of the invention.

A battery of autoclaves or closed boilers 1, 2, 3 and 4 are filled with pentosan-containing vegetable refuse, for example husks of oat. The material rests on the lower strainers $5^1$, $5^2$, $5^3$ and $5^4$ and is kept down by the upper strainers $6^1$, $6^2$, $6^3$, $6^4$.

Water or a weak solution of a dilute aqueous solution of a strong mineral acid is filled into the boilers, so that the material is saturated therewith, and the boilers are heated under pressure to a temperature between 100° and 180° C. The acid may be added when starting the process either successively or continuously or the whole quantity of acid may be added before the liquid enters the first boiler. The process having commenced the degree of acidity may be corrected by continuous or intermittent addition of acid anywhere in the system. For each 10 kg husks about 100 liters of a sulphuric acid having a strength of 0,5 normal may be used.

The solvent is supplied through the main conduit 7 from which pipes $8^1$, $8^2$, $8^3$, $8^4$ branch off to the bottom of each boiler. The furfural-containing solutions are discharged from the boilers by means of the pipes $9^1$, $9^2$, $9^3$, $9^4$ leading to the common main pipe 10. The lixiviation takes place in such a manner that the incoming solvent first meets a boiler containing nearly completely lixiviated material and the outgoing solution finally passes through a boiler containing fresh or nearly fresh material. For this purpose it is necessary that it should be possible to pass solution from one boiler to another and the supply pipes $8^1$, $8^2$, $8^3$, $8^4$ are therefore by means of pipes $11^1$, $11^2$, $11^3$, $11^4$ connected with each of the discharge pipes $9^2$, $9^3$, $9^4$, $9^1$ as shown in the drawing, valves $12^1$, $12^2$, $12^3$, $12^4$ respectively $13^1$, $13^2$, $13^3$, $13^4$ being provided at the branching off points. By opening or closing the valves the boilers may be connected up as desired for continuous passing of the liquid through the battery and for filling and emptying the same.

At the bottom of each boiler is provided steam coils $14^1$, $14^2$, $14^3$, $14^4$ for heating the solvent in the different boilers and for covering loss of heat by convection, radiation etc.

The number of boilers may vary but should preferably be at least four. One or two boilers in the battery are always disconnected for the emptying of lixiviated material or for the charging of new material. It is advantageous to use a greater number of boilers as in this way the composition of the outgoing furfural-containing solution will be more constant.

When a new boiler is to be connected up it is first filled with steam to the required pressure whereafter the furfural solution from the preceding boiler may be introduced.

The pressure required for forcing the water or the acid solution through the battery is preferably obtained by heating water or an acid solution to the required pressure in a separate boiler, the vapour pressure in the boiler forcing the liquid through the battery.

The furfural is then distilled off from the solution in a continuously working column or the like at ordinary pressure (or at increased or reduced pressure).

The liquid, from which the furfural has been removed and from which sediment etc. may be removed for example by filtering or by centrifuging, contains the main part of the acid originally added (a small part of the acid has been neutralized by basic substances present in the raw material) and is preferably returned to the lixiviation battery for the lixiviation of a new quantity of husks. In this way the solvent circulates with certain unavoidable losses and products which may remain in the solution without having been converted into furfural are thus recovered together with the acid present in the solution; also the heat of the solvent is recovered.

What we claim is:—

Method of producing furfural from pentosan-containing materials consisting in lixiviating the raw material with a dilute solution of a non-oxidizing strong mineral acid at a temperature between 100 and 180° centigrade so as to form furfural, allowing the furfural thus formed to accumulate in the lixiviation liquid, thereupon separating said liquid from the residues of the raw material, and distilling off furfural from the liquid thus separated.

GEORG HENNING BLOMQVIST.
BERTIL SIXTEN GROTH.